US008941957B2

(12) United States Patent
Yuno et al.

(10) Patent No.: US 8,941,957 B2
(45) Date of Patent: Jan. 27, 2015

(54) BATTERY CHARGER FOR AN ELECTRICALLY-DRIVEN VEHICLE AND METHOD OF CONFIRMING EARTH LEAKAGE APPLICABLE THERETO

(75) Inventors: Hideyo Yuno, Kyoto (JP); Tomoyuki Kawase, Shiga (JP); Naruaki Akai, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 231 days.

(21) Appl. No.: 13/811,953

(22) PCT Filed: Jun. 9, 2011

(86) PCT No.: PCT/JP2011/003253
§ 371 (c)(1),
(2), (4) Date: Jan. 24, 2013

(87) PCT Pub. No.: WO2012/014364
PCT Pub. Date: Feb. 2, 2012

(65) Prior Publication Data
US 2013/0120883 A1 May 16, 2013

(30) Foreign Application Priority Data

Jul. 30, 2010 (JP) .................................. 2010-171628
Apr. 11, 2011 (JP) .................................. 2011-087034

(51) Int. Cl.
*H02H 3/00* (2006.01)
*H02H 3/16* (2006.01)
(Continued)

(52) U.S. Cl.
CPC ............ *H02H 3/167* (2013.01); *B60L 11/1809* (2013.01); *H02J 7/0029* (2013.01);
(Continued)

(58) Field of Classification Search
USPC .......................................................... 361/42
See application file for complete search history.

(56) References Cited

U.S. PATENT DOCUMENTS 3,699,392 A * 10/1972 Lee et al. ........................ 361/49
3,733,517 A 5/1973 Wilson
(Continued)

FOREIGN PATENT DOCUMENTS

CN 1855341 A 11/2006
CN 101453114 A 6/2009
(Continued)

OTHER PUBLICATIONS

International Search Report for International Application No. PCT/JP2011/003253, dated Sep. 13, 2011, 1 page
(Continued)

*Primary Examiner* — Stephen W Jackson
(74) *Attorney, Agent, or Firm* — Brinks Gilson & Lione

(57) ABSTRACT

A battery charger for charging an electrically-driven vehicle by connecting the electrically-driven vehicle with an external power source, the battery charger includes an earth leakage detector operable to detect earth leakage of the battery charger; an earth leakage circuit breaker operable to switch energization from the external power source; an earth leakage confirmation relay capable of forcibly causing earth leakage in a downstream circuit of the earth leakage detector; a resistor unit connected in series with the earth leakage confirmation relay and capable of being set to any one of a plurality of leakage current values; and a controller operable to switch the earth leakage circuit breaker based on a detection result of the earth leakage detector while forcibly causing earth leakage in the downstream circuit.

5 Claims, 4 Drawing Sheets

(51) Int. Cl.
*B60L 11/18* (2006.01)
*H02J 7/00* (2006.01)
*H02H 3/33* (2006.01)

(52) U.S. Cl.
CPC ............... *H02H 3/16* (2013.01); *H02H 3/334* (2013.01); *Y02T 10/7005* (2013.01); *Y02T 10/7088* (2013.01); *Y02T 90/14* (2013.01)
USPC .......................................................... 361/42

(56) References Cited

U.S. PATENT DOCUMENTS

| | | | | |
|---|---|---|---|---|
| 3,978,400 | A | * | 8/1976 | Pettit .............................. 324/509 |
| 4,024,435 | A | | 5/1977 | Gross |
| 4,833,564 | A | * | 5/1989 | Pardue et al. ................ 361/93.6 |
| 5,231,309 | A | | 7/1993 | Soma et al. |
| 5,600,523 | A | | 2/1997 | Park |
| 8,447,543 | B2 | * | 5/2013 | Dickinson et al. .............. 702/60 |
| 8,466,656 | B2 | * | 6/2013 | Hooker et al. ................. 320/109 |

FOREIGN PATENT DOCUMENTS

| | | | |
|---|---|---|---|
| CN | 101562328 | A | 10/2009 |
| JP | 3-93422 | A | 4/1991 |
| JP | 6-245364 | A | 9/1994 |
| JP | 11-205909 | A | 7/1999 |
| JP | 2000-354332 | A | 12/2000 |
| JP | 2002-8510 | A | 1/2002 |
| JP | 2002-078187 | A | 3/2002 |
| JP | 2005-158559 | A | 6/2005 |
| JP | 2005-183226 | A | 7/2005 |
| JP | 2006-302601 | A | 11/2006 |
| JP | 2009-142021 | A | 6/2009 |
| JP | 2009-199767 | A | 9/2009 |

OTHER PUBLICATIONS

International Preliminary Report on Patentability for International Application No. PCT/JP2011/003253, dated Feb. 5, 2013, 5 pages.
Office Action issued in corresponding Chinese Patent application No. 201180036828.7, dated Jul. 30, 2014, with translation of Search Report, 8 pages.
Extended European Search Report in European Application No. 11806425.2, dated Jul. 8, 2014, 9 pages.
International Preliminary Report on Patentability in International Application No. PCT/JP2011/003252, dated Feb. 12, 2013, 6 pages.
International Search Report in International Application No. PCT/JP2011/003252, dated Jul. 19, 2011, 1 page.
Office Action and Search Report, and partial translation thereof, in corresponding Chinese Application No. 201180034001.2, dated Sep. 18, 2014, 8 pages.

* cited by examiner ically-driven vehicle such as, for example, an electric vehicle (EV) or a plug-in hybrid vehicle (PHV) from an external power source, and a method of confirming earth leakage applicable to such a battery charger.

BATTERY CHARGER FOR AN ELECTRICALLY-DRIVEN VEHICLE AND METHOD OF CONFIRMING EARTH LEAKAGE APPLICABLE THERETO

TECHNICAL FIELD

The present invention relates to a battery charger and, in particular, to a battery charger for charging an electrically-driven vehicle such as, for example, an electric vehicle (EV) or a plug-in hybrid vehicle (PHV) from an external power source, and a method of confirming earth leakage applicable to such a battery charger.

BACKGROUND ART

A conventional battery charger of this kind confirms earth leakage based on a leakage current value set by an earth leakage confirmation resistor and determined for every product (see, for example, Patent Document 1).

FIG. 4 is a block diagram of a conventional battery charger. As shown in FIG. 4, the conventional battery charger includes an earth leakage detector 11 for detecting earth leakage of the battery charger, an earth leakage circuit breaker 12 for switching energization of the battery charger from a commercially available external power source, an earth leakage confirmation relay 13 for switching an earth leakage confirmation circuit that is controlled by an ECU (electronic control unit) 15 provided on a side of a charging device to forcibly cause earth leakage in a circuit positioned downstream of the earth leakage detector 11, and an earth leakage confirmation resistor 14 for setting a current value to cause the earth leakage.
Patent Document 1: JP11-205909A

SUMMARY OF THE INVENTION

Problems to be Solved by the Invention

However, in the conventional construction referred to above, if the leakage current value for earth leakage confirmation differs, the earth leakage confirmation resistor differs for every product and, hence, a wide variety of products must be manufactured in small quantities, thus posing a problem that an inexpensive battery charger cannot be provided.

Also, if an electrically-driven vehicle is charged in a place where a voltage applied from the commercially available external power source differs, the leakage current value for earth leakage confirmation increases or decreases depending on the voltage because the earth leakage confirmation resistor is fixed, accordingly, the earth leakage cannot be confirmed at a predetermined leakage current value, thus resulting in a less-reliable battery charger.

Further, the electrically-driven vehicle cannot be charged even on the occurrence of malfunction on the side of prudence in which earth leakage is detected at a value that is lower than the predetermined leakage current value and not problematic in terms of safety, thus resulting in an inconvenient battery charger.

The present invention has been developed to solve the above-described problems, accordingly an objective of the present invention is to provide an inexpensive, highly-reliable and convenient battery charger for an electrically-driven vehicle.

Means to Solve the Problems

To solve the above problems, a first aspect of the present invention is directed to a battery charger for charging an electrically-driven vehicle by connecting the electrically-driven vehicle with an external power source, the battery charger includes an earth leakage detector for detecting earth leakage of the battery charger, an earth leakage circuit breaker for switching energization from the external power source, an earth leakage confirmation relay capable of forcibly causing earth leakage in a downstream circuit positioned downstream of the earth leakage detector, a resistor unit connected in series with the earth leakage confirmation relay and capable of being set to any one of a plurality of leakage current values, and a controller for switching the earth leakage circuit breaker based on a detection result of the earth leakage detector while forcibly causing earth leakage in the downstream circuit.

A second aspect of the present invention is directed to a method of confirming earth leakage applicable to a battery charger for providing an electrically-driven vehicle with electric power from an external power source by connecting the electrically-driven vehicle with the external power source, this method includes a first selection step of selecting, after detection of a voltage from the external power source, a first resistor that is determined based on a value of the detected voltage and a leakage current value set in advance, a second selection step of selecting a second resistor having a resistance value greater than that of the first resistor when earth leakage occurs in the battery charger with use of the first resistor selected in the first selection step, an informing step of informing a user of attention when earth leakage occurs in the battery charger with use of the second resistor selected in the second selection step, and a charging step of providing, after the informing step, the electrically-driven vehicle with electric power from the external power source.

Effects of the Invention

Each aspect of the present invention can provide an inexpensive, highly-reliable and convenient battery charger for an electrically-driven vehicle.

DETAILED DESCRIPTION OF THE PREFERRED EMBODIMENT(S)

Embodiments of the present invention are described hereinafter with reference to the drawings, but the present invention is not limited to the embodiments.
(Embodiment 1)

Figure 1:
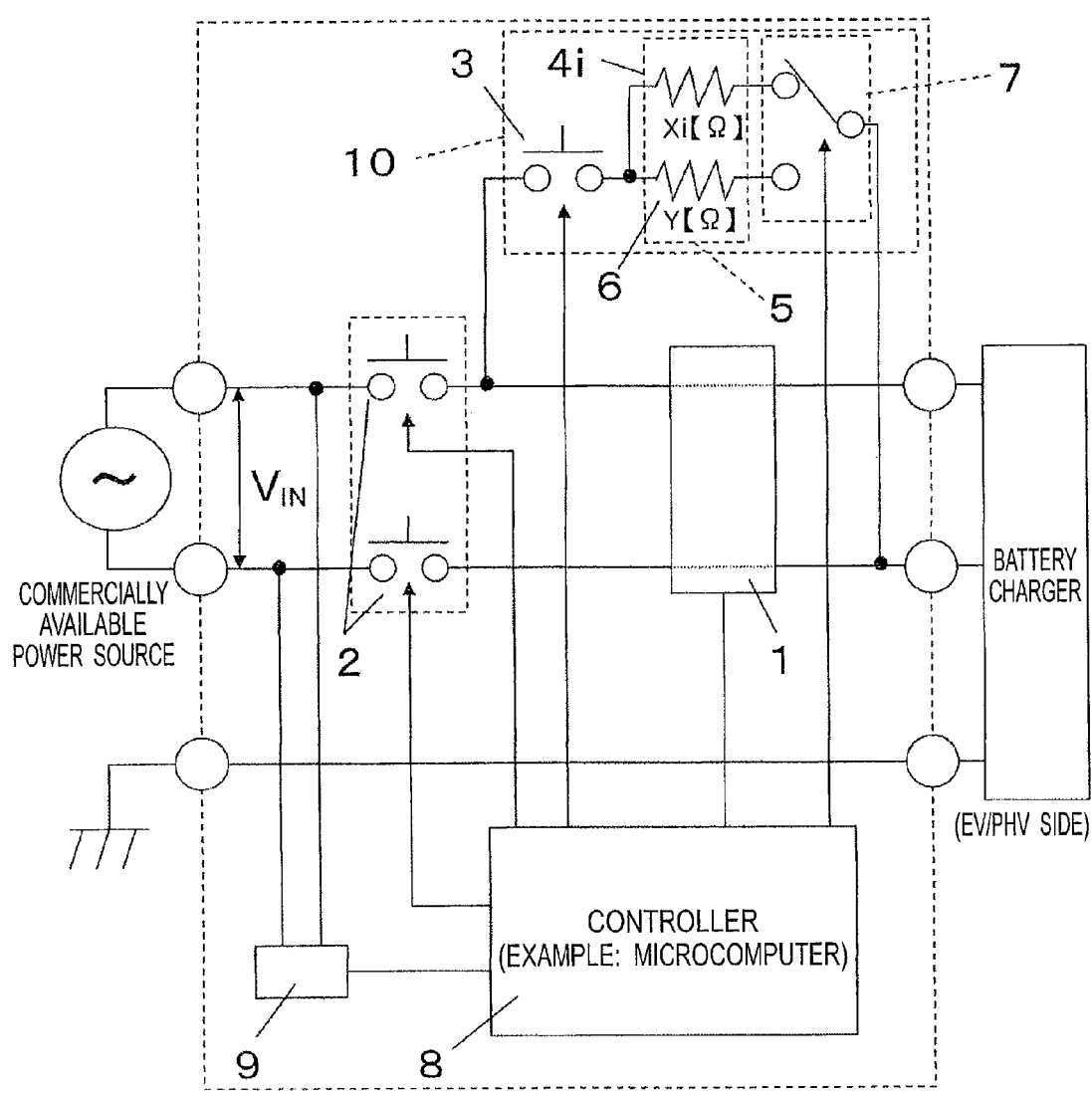
FIG. 1 is a block diagram of a battery charger for an electrically-driven vehicle according to a first embodiment of the present invention.
Figure 2:
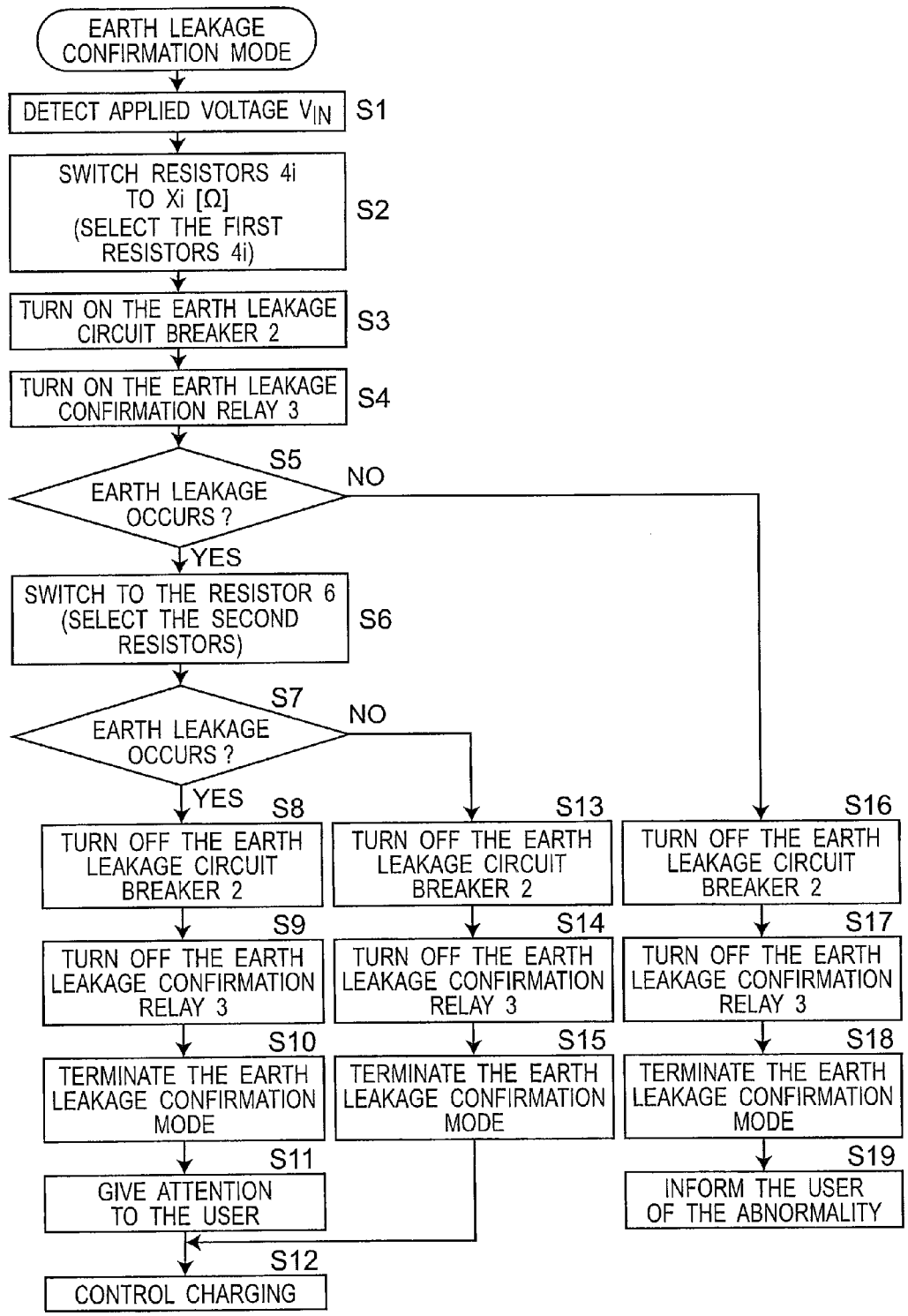
FIG. 2 is a flowchart indicating operation of the battery charger of FIG. 1.

FIG. 1 is a block diagram of a battery charger for an electrically-driven vehicle (hereinafter referred to simply as a "battery charger") according to a first embodiment of the present invention. In addition, FIG. 2 is a flowchart indicating operation of the battery charger as shown in FIG. 1.

In FIG. 1, the battery charger is a charging cable for connecting a charging device mounted in an electrically-driven vehicle with a receptacle outlet of a commercially available power source installed in, for example, a house, and the charging cable is used to charge the electrically-driven vehicle. The battery charger includes an earth leakage detector 1, an earth leakage circuit breaker 2, an earth leakage confirmation relay 3, a resistor unit 5 optimally includes a plurality of earth leakage confirmation resistors 4i (i=1, 2, . . . ) and at least one earth leakage confirmation resistor 6 for switching, a switching portion 7, a controller 8, and a primary side voltage detector 9.

The earth leakage detector 1 includes, for example, a ZCT (zero-phase-sequence current transformer) for detecting earth leakage of the battery charger. The ZCT is provided on a power line pair from the commercially available power source.

The earth leakage circuit breaker 2 includes, for example, a relay for switching energization of the battery charger from the commercially available power source.

The earth leakage confirmation relay 3 switches an earth leakage confirmation circuit to forcibly cause earth leakage in a circuit positioned downstream of the earth leakage detector 1.

The resistor unit 5 includes the earth leakage confirmation resistors (hereinafter referred to as "first resistors") 4i for setting a current value to cause the earth leakage and the earth leakage confirmation resistor 6 for switching (hereinafter referred to as a "second resistor"), and the resistors are connected in series with the earth leakage confirmation relay 3. Here, preferably, plural first resistors 4i are prepared, and each of the first resistors 4i has a value Xi [Σ] selected based on a voltage of the commercially available power source that may differ from one country to another. A value $X_1$ [Σ] is determined so as to correspond to a voltage value in one country and a value $X_2$ [Σ] is determined so as to correspond to a voltage value in another country. In addition, the second resistor 6 has a value Y [Σ] that is determined from the viewpoint of following. If the controller 8 determines that earth leakage has occurred in the presence of a slight leakage current, though it is safe in nature, the battery charger becomes hard-to-use. Hence, the value Y [Σ] of the second resistor 6 is determined so as to be able to detect such a slight leakage current.

The switching portion 7 is connected in series with the earth leakage confirmation relay 3 and the resistor unit 5 to selectively switch between the plurality of first resistors 4i and the second resistor 6.

An earth leakage confirmation circuit 10 is made up by connecting the earth leakage confirmation relay 3, the resistor unit 5 and the switching portion 7 in series. The earth leakage confirmation circuit 10 is provided between an upstream line and a downstream line of the power line pair with respect to the ZCT.

The controller 8 is made up of, for example, a microcomputer or an ECU (electronic control unit) to control switching of energization of the battery charger and a compulsory earth leakage confirmation operation. Also, the controller 8 turns the earth leakage circuit breaker 2 off to interrupt energization upon receipt of an earth leakage detecting signal from the earth leakage detector 1.

The primary side voltage detector 9 detects a voltage applied from the commercially available power source.

Operation and function of the battery charger of the above-described construction are explained hereinafter with reference to a flowchart of FIG. 2.

In FIG. 2, when an earth leakage confirmation mode of confirming whether or not the battery charger can correctly detect earth leakage is started, the primary side voltage detector 9 detects a voltage $V_{IN}$ applied from the commercially available power source and outputs a detection result to the controller 8 (step S1).

Upon receipt of the detection result $V_{IN}$ that may differ from one country to another, the controller 8 switches the switching portion 7 to select one of the first resistors 4i so that the leakage current value may become a predetermined value I1. The resistor selected in this event is a first resistor 4i having a value Xi [Σ] ($Xi=V_{IN}\div I_i$) (step S2). Also, the controller 8 turns on the earth leakage circuit breaker 2 and the earth leakage confirmation relay 3 (steps S3 and S4).

In the above-described manner, a leakage current flows through the earth leakage confirmation circuit 10. As a result, an equilibrium state of electric currents flowing through the power line pair in opposite directions breaks up and the earth leakage detector 1 detects the occurrence of an electric field to thereby detect the occurrence of earth leakage and outputs a detection result to the controller 8.

Upon detection of the occurrence of earth leakage (step S5), the controller 8 switches to the second resistor 6 (resistance value Y [Σ] ($Y=V_{IN}\div I_2$)) in the resistor unit 5 so that the leakage current value may become a value $I_2$ that is lower than the aforementioned value I1 and does not cause any problem for safety (step S6).

Thereafter, when the earth leakage detector 1 detects earth leakage based on the leakage current value $I_2$ (step S7), the controller 8 turns off the earth leakage confirmation relay 3 and the earth leakage circuit breaker 2 (steps S8 and S9) and then terminates the earth leakage confirmation mode (step S10). In this case, the controller 8 determines that earth leakage has occurred in the presence of a slight leakage current that is regarded as being safe in nature and, hence, in order to overcome this, the controller 8 performs a charging operation (step S12) while giving attention to a user and informing him or her of the necessity of repair on a display (not shown) (step S11).

If the earth leakage detector 1 detects no earth leakage based on the leakage current value $I_2$ at step S7, the controller 8 determines that the battery charger functions normally and turns off the earth leakage confirmation relay 3 and the earth leakage circuit breaker 2 (steps S13 and S14). Thereafter, the controller 8 normally terminates the earth leakage confirmation mode (step S15) and performs the charging operation (step S12).

If the earth leakage detector 1 detects no earth leakage based on the leakage current value $I_1$ at step S5, the controller 8 determines that a state of not detecting earth leakage is abnormal because earth leakage is forcibly caused at present and turns of the earth leakage confirmation relay 3 and the earth leakage circuit breaker 2 (steps S16 and S17). Thereafter, the controller 8 abnormally terminates the earth leakage confirmation mode (step S18), interrupts energization, and informs the user of the abnormality on, for example, a display (step S19).

As described above, a plurality of products have been hitherto prepared for respective leakage current values that are used to confirm earth leakage, but they can be grouped together in this embodiment in which the plurality of first resistors 4i and the second resistor 6, all contained in the resistor unit 5, are appropriately switched to confirm earth leakage, accordingly, a limited variety of products can be manufactured in large quantities, thus making it possible to provide an inexpensive battery charger. It is noted that the battery charger according to this embodiment can be realized using a variable resistor in place of the resistor unit 5.

In this embodiment, the primary side voltage detector 9 is provided to detect a voltage applied from a commercially available power source as an external power source and the controller 8 controls switching of the first resistors 4i depending on the applied voltage from the external power source to thereby confirm earth leakage based on a predetermined leakage current value that is immune to the voltage, thus enhancing the reliability. Also, by causing an electric current to flow through the second resistor 6 after detection of the applied voltage $V_{IN}$, when overvoltage is detected, a subsequent sequence can be stopped, thus making it possible to prevent the second resistor 6 from being damaged.

Further, in this embodiment, the controller 8 confirms earth leakage based on a plurality of leakage current values and, hence, an electrically-driven vehicle can be charged even on the occurrence of malfunction on the side of prudence in which earth leakage is detected at a value that is lower than the predetermined leakage current value and not problematic in terms of safety, thus resulting in an easy-to use battery charger.

(Embodiment 2)

A battery charger according to a second embodiment of the present invention is explained hereinafter. The construction of the battery charger according to this embodiment is essentially the same as that of the battery charger shown in FIG. 1. Accordingly, in the following explanation, the same component parts as those shown in FIG. 1 are designated by the same reference numerals and explanation thereof is omitted.

Figure 3:
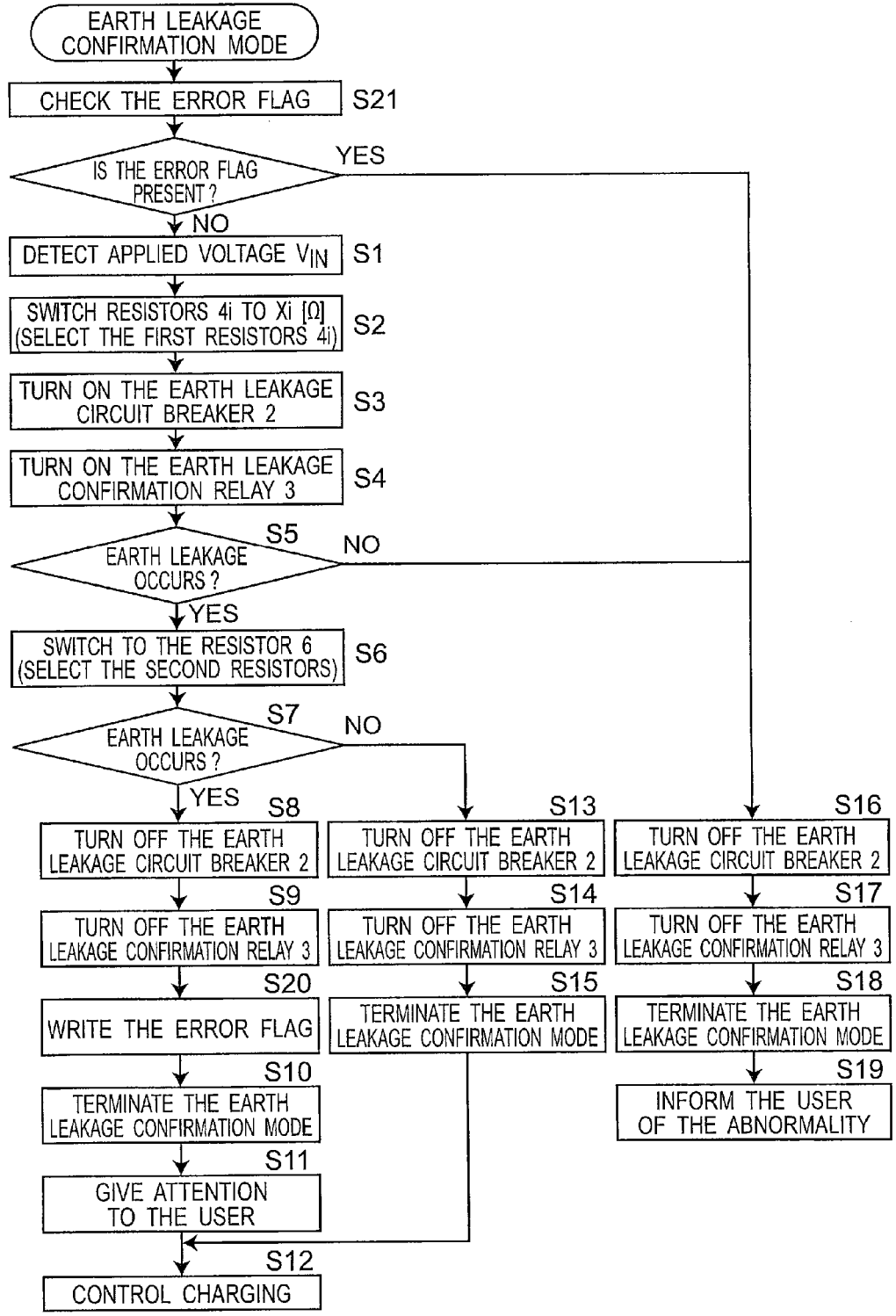
FIG. 3 is a flowchart indicating operation of a battery charger according to a second embodiment of the present invention.
Figure 4:
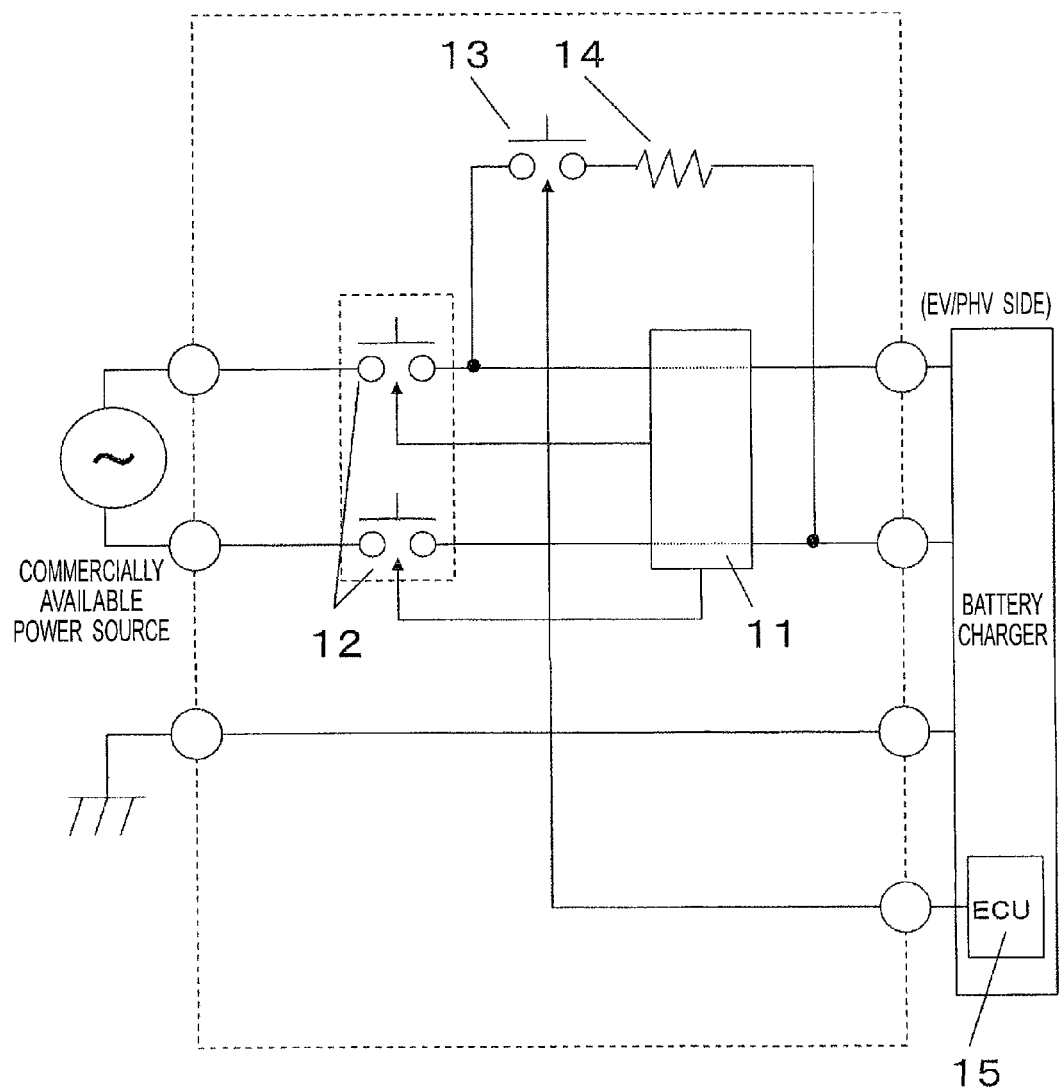
FIG. 4 is a block diagram of a conventional battery charger.

FIG. 3 is a flowchart indicating operation of the battery charger according to the second embodiment of the present invention. The flowchart of FIG. 3 differs from the flowchart of FIG. 2 in that the former includes steps S20 and S21. Accordingly, in FIG. 3, the same steps as those of FIG. 2 are designated by the same step numbers and explanation thereof is omitted.

In FIG. 3, if earth leakage occurs at Xi [Σ] and Y [Σ] after step S9, the controller 8 writes an error flag in a non-volatile memory (not shown) contained therein (step S20). Thereafter, the processing after step S10 is executed and a charging control is executed at step S12. Upon completion of this charging control, an earth leakage confirmation mode of FIG. 3 (next earth leakage confirmation mode) is started at a subsequent appropriate timing.

After the start of the next earth leakage confirmation mode, the controller 8 confirms the presence or absence of the error flag at step S21 and if the error flag is present, the controller 8 informs the user of abnormality and conducts no charging operation (steps S16 to S19), thereby making it possible to enhance the usability and avoid the user from continuing to use the battery charger in a slight abnormal state.

Industrial Applicability

As described above, because the battery charger for an electrically-driven vehicle according to the present invention is inexpensive and reliable and can enhance the usability, it is applicable to an inspection instrument for an automotive vehicle, a detachable power source cable for various facilities, and the like.

DESCRIPTION OF THE REFERENCE NUMERALS

1 Earth leakage detector
2 Earth leakage circuit breaker
3 Earth leakage confirmation relay
4*i* Earth leakage confirmation resistors (first resistor)
5 Resistor unit
6 Earth leakage confirmation resistor for switching (second resistor)
7 Switching portion
8 Controller
9 Primary side voltage detector

The invention claimed is:

1. A battery charger for charging an electrically-driven vehicle by connecting the electrically-driven vehicle with an external power source, the battery charger comprising:
    an earth leakage detector operable to detect earth leakage of the battery charger;
    an earth leakage circuit breaker operable to switch energization from the external power source;
    an earth leakage confirmation relay capable of forcibly causing earth leakage in a downstream circuit of the earth leakage detector;
    a resistor unit connected in series with the earth leakage confirmation relay and capable of being set to any one of a plurality of leakage current values; and
    a controller operable to switch the earth leakage circuit breaker based on a detection result of the earth leakage detector while forcibly causing earth leakage in the downstream circuit.

2. The battery charger according to claim 1, further comprising a primary side voltage detector operable to detect a voltage applied from the external power source,
    wherein the controller sets the resistor unit to any one of the plurality of leakage current values depending on the voltage applied from the external power source.

3. The battery charger according to claim 1, wherein the plurality of leakage current values includes a leakage current value that is not problematic in terms of safety and even if the resistor unit is set to the leakage current value that is not problematic in terms of safety, the controller switches the earth leakage circuit breaker based on the detection result of the earth leakage detector while forcibly causing earth leakage in the downstream circuit.

4. A method of confirming earth leakage applicable to a battery charger for providing an electrically-driven vehicle with electric power from an external power source by connecting the electrically-driven vehicle with the external power source, the method comprising:
    a first selection step of selecting, after detection of a voltage from the external power source, a first resistor that is determined based on a value of the detected voltage and a leakage current value set in advance;
    a second selection step of selecting a second resistor having a resistance value greater than that of the first resistor when earth leakage occurs in the battery charger with use of the first resistor selected in the first selection step;
    an informing step of informing a user of attention when earth leakage occurs in the battery charger with use of the second resistor selected in the second selection step; and
    a charging step of providing, after the informing step, the electrically-driven vehicle with electric power from the external power source.

5. The method of confirming earth leakage according to claim 4, further comprising:
    a writing step of writing an error flag when earth leakage occurs in the battery charger with use of the second resistor selected in the second selection step;
    a confirmation step of confirming presence or absence of the error flag before detection of the voltage from the external power source; and
    a second informing step of informing the user of abnormality when a determination is made in the confirmation step that the error flag is present.

* * * * *